United States Patent [19]
McClusky

[11] 3,805,905
[45] Apr. 23, 1974

[54] VIBRATORY MEANS FOR A RECEPTACLE WEIGHTING APPARATUS

[76] Inventor: Stanley A. McClusky, 3001 Baylor Ave., Bakersfield, Calif. 93305

[22] Filed: Apr. 11, 1973

[21] Appl. No.: 350,081

Related U.S. Application Data

[62] Division of Ser. No. 271,495, July 13, 1972, which is a division of Ser. No. 179,761, Sept. 13, 1971.

[52] U.S. Cl.............................. 177/160, 177/DIG. 11
[51] Int. Cl.............................................. G01g 19/00
[58] Field of Search ........... 177/160, 184, 187, 243, 177/DIG. 11

[56] References Cited
UNITED STATES PATENTS
2,981,349   4/1961   Douglas...................... 177/DIG. 11
FOREIGN PATENTS OR APPLICATIONS
674,125   11/1963   Canada............................ 177/160

Primary Examiner—George H. Miller, Jr.
Attorney, Agent, or Firm—Edward F. Jaros

[57] ABSTRACT

A bag filling and weighing apparatus having a bag applying station and diametrically opposite thereto a single combined filling and weighing station at which simultaneous feeding of articles by both bulk and dribble feed methods is provided, both dribble and bulk feed having a common discharge zone and both dribble and bulk feed being operable until a preselected underweight condition is reached at which time the bulk feed is stopped and the dribble feed continues feeding until a precise final weight is reached at the single station. The apparatus includes means to rapidly transmit weight of each article to a scale before the article is received in a bag or box, and includes means to impart vibrations in a horizontal plane to the bag or box during filling independently of the weight sensing by the scale.

8 Claims, 14 Drawing Figures

VIBRATORY MEANS FOR A RECEPTACLE WEIGHING APPARATUS

This is a division of prior application Ser. No. 271,495 filed on July 13, 1972 which is a divisional application of prior application Ser. No. 179,761 filed on Sept. 13, 1971.

BACKGROUND OF THE INVENTION

Receptacles such as bags or boxes are required by industry and by the government to contain the precise number of articles marked on said receptacles or at least the designated weight of contents marked on the receptacles. It is necessary to achieve at least such marked weight and preferably the precise weight since any overage is a loss to the supplier. Prior proposed apparatuses have included machines for weighing articles fed to the receptacle until a selected weight is reached. Very rapid filling and weighing of such receptacles by articles of produce such as potatoes and the like has been achieved by such prior proposed apparatus in which the quantity and volume has reached from 600 to a thousand boxes per hour. There is, however, a present need in packing houses of machines of lower volume and capacity to rapidly fill and weigh receptacles without the expense of filling and weighing equipment which may be used for only a short period of time and at only a small fraction of designated capacity. Examples of such prior proposed high capacity filling and weighing equipment are disclosed in my U.S. Pat. Nos. 3,416,619 and 3,416,620.

In such latter prior constructions, a separate bulk feed station with an associated weighing device and a spaced separate dribble feed station with an associated weighing scale was utilized to successively fill and weigh a box to a preselected weight. Each station had a separate article discharge station for the feed conveyors. A receptacle being filled thus made at least two stops before filling was completed and the receptacle conveyor was correlated in its movement to properly and timely position a receptacle at each of the bulk and dribble feed stations.

In other prior proposed constructions, a vibrating tray type conveyor moved articles continuously along bulk and dribble feed paths, bulk feed being discharged into an accumulator while the dribble feed was being discharged into a weigh bucket below its accumulator, both bulk and dribble feed trays being continuously vibrated. During change of receptacles both dribble and bulk feeds discharged into their respective accumulators because of the continuous vibrating feeding action of the tray conveyor (U.S. Pat. No. 3,540,538).

SUMMARY OF THE INVENTION

The present invention relates to a relatively low cost filling and weighing apparatus of selected capacity and volume to fill the need of packing houses having relatively small or medium packing volume requirements. More particularly the present invention contemplates a filling and weighing apparatus for receptacles such as bags which is flexibly arranged for adaption to various space requirements and which provides rapid convenient filling of bags.

Generally speaking the present invention contemplates a rotatable arm means having bag holding means at each end, the arm means being positionable at a bag applying station and at the opposite end of the arm means is positioned at a filling and weighing station. Both bulk and dribble feeding of articles is performed at the single filling and weighing station and one weighing scale is used. A novel article conveyor means is used to deliver such articles to a common discharge zone where both bulk and dribble fed articles are directly discharged to a receptacle. To facilitate rapid feeding, both bulk and dribble feed belt means are used to fill the bag, the bulk feed belt means being stopped at a predetermined underweight condition and the dribble feed belt means continuing until a precise weight condition is achieved. Upon filling a bag at the filling and weighing station, the rotatable arm means is turned through 180° and during its travel the filled bag is released on a conveyor means for transport to a sewing means where the top of the bag is sewn closed. Upon completion of the half turn, one end of the arm means is positioned at the bag applying station and the other end, with a bag thereon, is positioned at the filling station.

A primary object of the present invention is to disclose and provide a filling and weighing apparatus of simplified and inexpensive construction for packaging and weighing of articles under relatively medium volume requirements.

An object of the invention is to disclose and provide a filling and weighing apparatus including an article conveyor means of a novel construction.

Another object of the invention is to disclose and provide such an article conveyor means wherein bulk and dribble feed conveyor belt means are so associated and correlated in operation that both belt means are employed to fill a bag to a preselected underweight condition to achieve rapid filling of the bag.

Another object of the invention is to disclose and provide a composite unitary article feed conveyor means wherein a dribble feed belt means is vertically spaced and is parallel to the bulk feed belt means for a major portion of the length of a conveyor means, the dribble feed belt means then merging at a common discharge zone with the bulk feed belt means.

A further object of the present invention is to provide a novel receptacle filling and weighing means wherein the determination of weight of each article is made before an article is deposited in the receptacle and final precise weight is determined while the article making such final weight is moving from the dribble belt to the receptacle.

A still further object of the invention is to disclose and provide means for immediately sensing weight of an article traveling in a discharge path to a receptacle whereby succeeding articles may be stopped before entering the discharge path.

A further object of the invention is to provide a novel means for imparting vibrations to a receptacle being filled in a plane which will not interrupt or interfer with the weighing of articles being fed to the receptacle.

The invention contemplates a novel arrangement of a receptacle, weighing platform of a scale, and delivery means to the receptacle whereby the weight of each article is transmitted to the scale before the article is received in the receptacle, such weight sensing and transmittal being provided for bulk and dribble feed means. Means are provided for shaking only the receptacle while feeding of articles thereto, particularly during bulk feeding, shaking being stopped during final dribble feeding.

Figure 1:
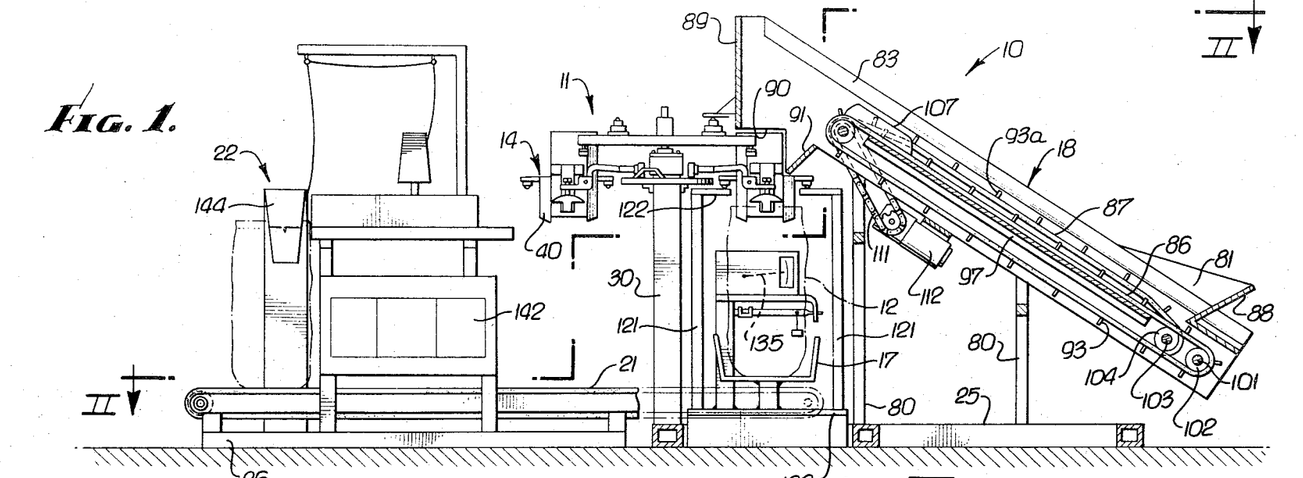
FIG. 1 is a side elevational view of a bag filling and weighing apparatus embodying this invention, and showing an article conveyor means partly in section, the section being taken in a vertical plane passing generally through the longitudinal axis of the conveyor means.
Figure 4:
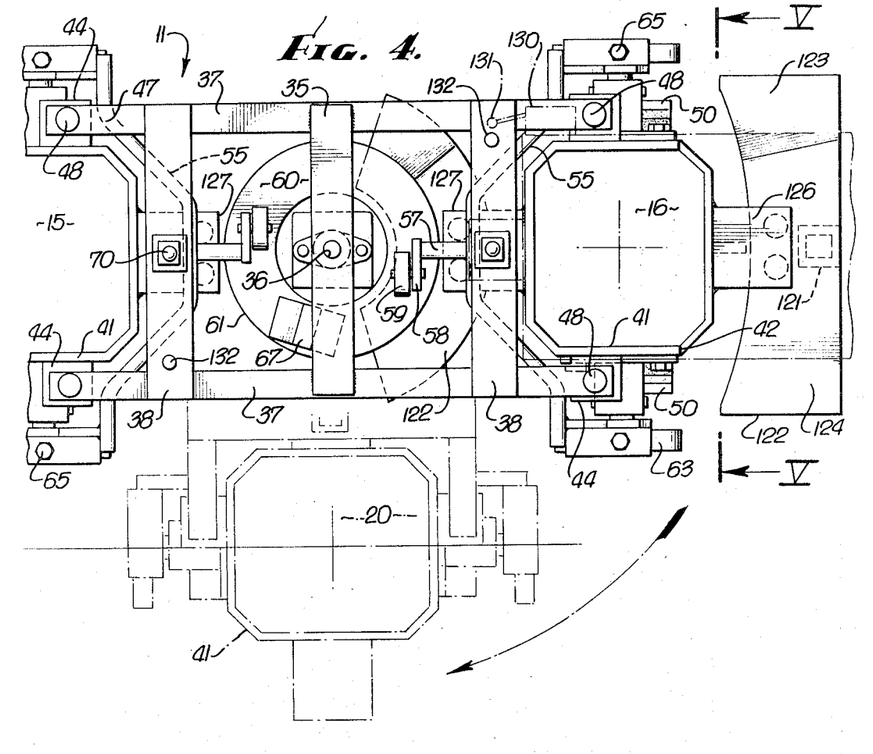
FIG. 4 is a horizontal sectional view taken in the planes indicated by lines IV—IV of FIG. 3.

Referring particularly to FIGS. 1 and 4, an apparatus embodying this invention is generally indicated at 10 and may include a bag carrying means 11 for transporting or conveying in a circular path a bag 12. Bag 12 may be attached to and suspended from a bag holding means 14 at a bag applying or bag attachment station 15 for movement to and through a bag filling and weighing station 16. At the bag filling and weighing station 16, a novel composite single bulk and dribble feed conveyor means generally indicated at 18 moves discrete articles such as potatoes or other produce, to a common discharge zone at station 16 whereby both bulk and dribble feed means simultaneously are used to fill bag 12 to a selected weight at one filling station. At station 16, weighing means 17 are associated with bag holding means 14 so that weight of the articles fed to the bag will cause the bulk portion of the feed conveyor means to stop at a less than final weight condition and then cause a dribble feed portion of the conveyor means to stop at a final precise weight. The bag 12 is then moved by the bag carrying means to a discharge or bag release station 20 where the filled bag is transported by a filled bag transport or conveyor means 21 to a bag sewing station 22 where the top of the bag is sewn into closed position for shipping and storage.

In this example, the bag 12 may comprise a pliant flexible receptacle or container of suitable fabric such as burlap or of paper or plastic material. Exemplary bag 12 is elongated and has a closed bottom and an open top of selected diameter so that it may be readily sleeved over and associated with the lower portion of bag holding means 14 as later described.

Figure 2:
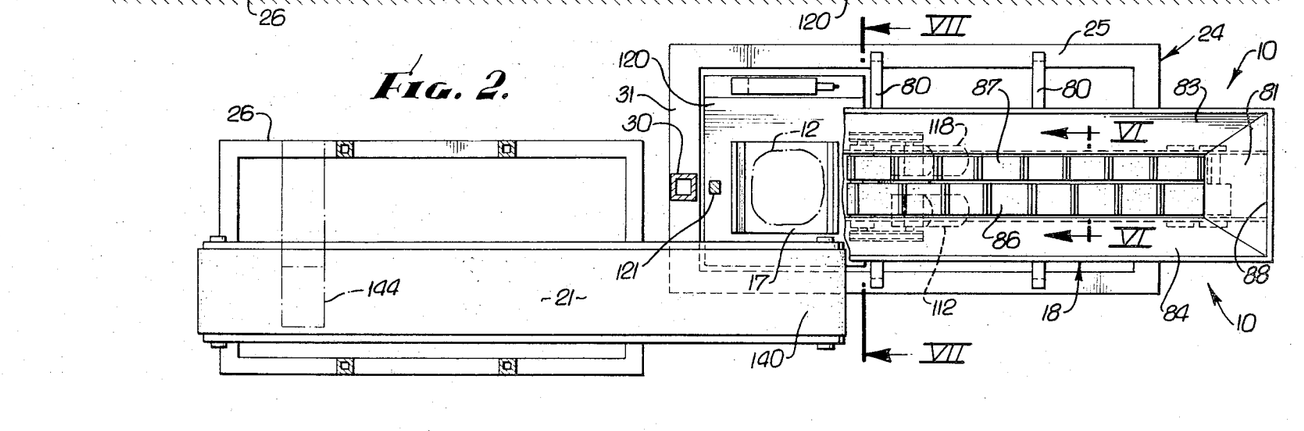
FIG. 2 is a top view of the apparatus shown in FIG. 1, the view being taken in the planes indicated by line II—II of FIG. 1.

In exemplary apparatus 10 (FIG. 2), a base frame means generally indicated at 24 may comprise a rectangular base fram 25 of frame members having a suitable cross-sectional configuration such as rectangular. Base frame 25 may provide a support means for bag carrying frame 11, article conveyor means 18, and weighing means 17 at station 16 for weighing the filled bags. A base frame 26 separated from base frame 25 may similarly be of rectangular form with frame members of square cross-section for supporting the sewing means at sewing station 22 and filled bag conveyor means 21. Other constructions of base frame means 24 may be utilized; however, the separateness of base frames 25 and 26 affords ready, convenient adaptation of apparatus 10 to different space conditions.

Bag carrying means 11 comprises an upstanding column or post 30 of polygonal cross-section, column 30 being secured in a suitable manner as by welding to an end transverse frame member 31 of base frame 25. The upper end of column 30 carries therewithin a suitable bearing means 32 for an upstanding stub shaft 33 which projects above the top of column 30. Supported in fixed relation on the upper portion of shaft 33 and spaced above the top of column 30 is a transverse arm means 34 having an intermediate beam 35 provided with a central bore 36 to receive in fixed relation shaft 33 as by a key and slot means (not shown). The bearing means 32 may include suitable thrust bearings so that under load arm means 34 may be readily manually rotated. Transverse arm means 34 also includes spaced parallel side members 37 joined by interconnecting end members 38 to provide a rigid beam-like structure for carrying bag holding means 14 at each end and a filled bag 12.

Figure 3:
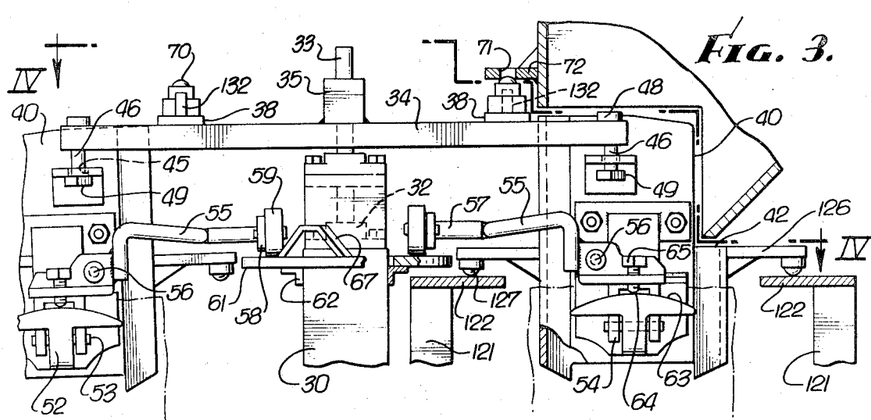
FIG. 3 is an enlarged fragmentary elevational view of the upper portion of the bag carrying means, the view being partly in section at the bag filling and weighing station.

Bag holding means 14 may include an open-ended hollow polygonal in cross-section, body member 40 having a tubular wall 41 provided with an article inlet opening 42 facing away from column 30 and formed in the upper portion of body member 40 for direct communication with the discharge zone of conveyor means 18 for admitting articles for passage thru hollow body member 40 and then into a bag 12 carried thereby. Opposite side porions of wall 41 are provided with angle brackets 44 each of which includes a port 45 to loosely receive a hanger bolt 46 carried by an extension 47 of side arm member 37 for supporting body member 40 from arm means 34. Bolt 46 is provided with an enlarged head 48 and nut 49 with sufficient space between nut 49, bracket 44 and the bottom edge of side extension 47 to permit free loose relative movement of body member 40 with respect to arm means 34 to permit weighing of bag 12 as later described. Such hanging or supporting condition is shown at the left of FIG. 3 where nut 49 is in contact with bracket 44. The weighing condition is shown at the right of FIG. 3 where nut 49 is out of contact with bracket 44.

Figures 5, 6, 7:
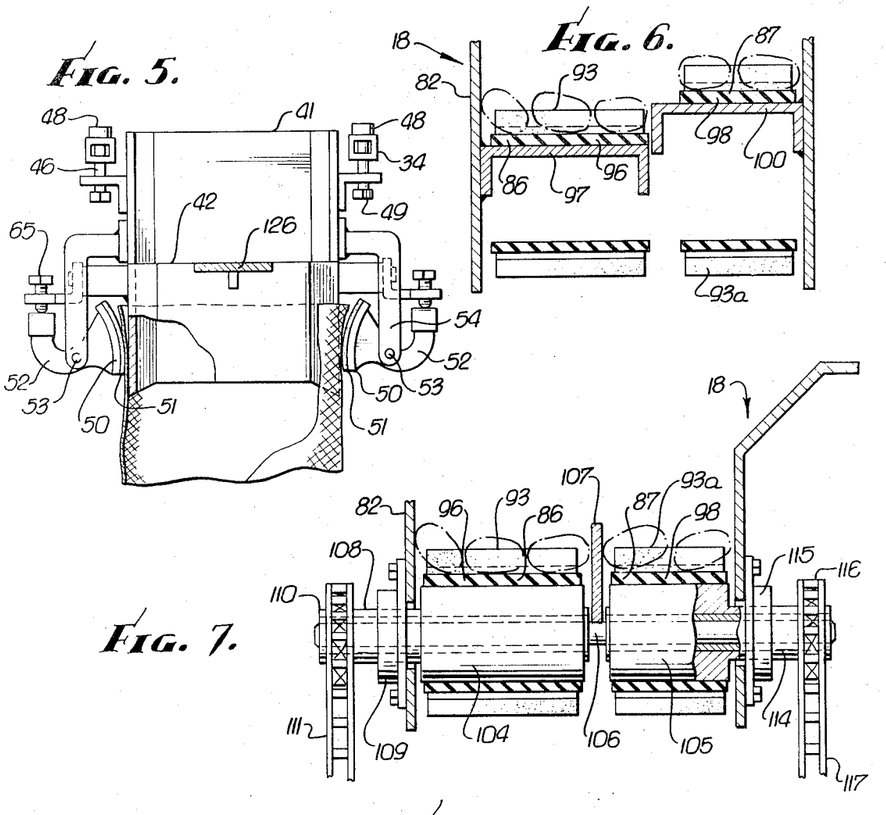
FIG. 5 is a fragmentary enlarged sectional view taken in the plane indicated by line V—V of FIG. 4, a portion of the bag and holder being broken away.
FIG. 6 is an enlarged fragmentary sectional view taken in the vertical plane indicated by the line VI—VI of FIG. 2.
FIG. 7 is an enlarged sectional view taken in the vertical plane indicated by line VII—VII of FIG. 2.

Holding means 14 also includes means for frictionally grasping and releasing the top end of a bag 12. As best seen in FIG. 5, an exemplary bag clamping means includes arcuate clamping shoes 50 each having a friction surface 51 for pressing against a surface of the top end of a bag 12 to frictionally hold the top end of bag 12 against the outer surface of wall 41. Each clamping shoe 50 is carried on a curved clamping member 52 which is pivotally mounted at 53 from a yoke 54 carried at one end of a bail-like member 55 which is pivotally mounted at 56 to body wall 41. Bail member 55 terminates in a central single extension rod 57 to which is fixed one end of a trailing arm 58 upon which is rotatably mounted adjacent its other end a cam follower wheel 59. Cam follower wheel 59 rollably engages top cam surface 60 of an annular cam ring 61 secured by suitable angle brackets 62 to column 30.

Means for adjusting the clamping and frictional grasping of the friction shoe 50 against wall 41 comprises an arcuate surface 63 on member 52 providing a bearing face 64 for an adjusting nut 65 threaded in the extremity of bail member 55. Since pivotal mounting 53 of member 52 is about an axis offset from the center of curvature of clamping shoe 50, it will be apparent that adjustment of bolt 65 will vary the pressure engagement of shoe 50 with the bag when the bag is positioned between the shoe and the wall 41.

When a bag is assembled on the bag holding means 14, the top open end of the bag is raised into ensleeving relationship with the lower portion of body 40 and is moved upwardly until friction surface 51 of the shoes 50 are displaced upwardly and the top portion of one bag is located between the shoe and the wall 41. When the clamp shoes return by gravity to their normal position in contact with wall 41, each shoe 50 tightly frictionally clamps the fabric of bag 12 against wall 41 to the extent permitted by the location of adjustment bolt 65 which limits the downward movement of the curved friction shoe 50.

Release from frictional engagement of shoe 50 with bag 12 occurs by lifting upwardly on yoke arm 55 so that a lifting force is imparted to shoe 50 by pivotal action of bail arm 55 about its pivot 56 when the follower wheel 59 engages an upwardly directed cam ramp face 67 provided on the top of cam ring 61. Thus, as cam follower wheel 59 is raised, the adjustment bolt 65 carried on the opposite side of pivotal axis 56 presses downwardly on the shoe member 52 causing pivotal movement about axis 53 to lift friction surface 51 of shoe 50 upwardly and away from the fabric of bag 12. The cam ramp face 67 is opposite release station 20 and a filled bag 12 is released and deposited upon the adjacent end of the filled bag conveyor means 21.

Having described operational functions of one bag holding means 14, and returning to the empty bag condition, it will be noted that an empty bag 12 attached to bag holding means 14 as above described may then be positioned at the bag filling and weighing station 16 by manually rotating arm means 34 through 180° to position bag holding means 14 at the discharge end of conveyor means 18. Means to accurately stop and releaseably hold the arm at such filling position may be provided by an upwardly directed biased ball detent means 70 carried on the top of each member 38 and adapted for releasable detent holding engagement with a detent recess or port 71 provided on a bracket 72 carried by end wall 73 of conveyor means 18.

Article conveyor means 18 is of novel construction and operation and is supported in upwardly inclined relation by suitable upstanding spaced frame members 80 secured to base frame 25. Article conveyor means 18 includes an article retaining zone 81 defined by upwardly and outwardly inclined surfaces 83 and 84 of side and end conveyor walls enclosing feed conveyor belt means 86 and 87 located below surfaces 83, 84. The lower end wall 88 may be upwardly extended to facilitate filling and retention of articles at the lower end of the feed conveyor means. At its upper end, conveyor means 18 includes end wall 89 which overhangs bag holding means 14 and which is provided with a downwardly facing cut-out or notch 90 corresponding with the configuration of the article inlet opening 42 of the body 40 so that articles discharged from conveyor means 18 will be guided into the open through passageway of bag holding means 14. A suitable downwardly inclined discharge surface 91 on conveyor means 18 is also provided.

The belt means 86 may be wider than belt means 87 and serves as a bulk feed conveyor for moving a plurality of articles in bulk random fashion to a discharge zone at the upper end of conveyor means 18 for transfer to the bag 12 through bag holding means 14. Belt means 86 may include transverse longitudinally spaced cleats 93. As best seen in FIG. 6, belt means 86 is provided with an upper belt lay 96 supported by an inverted channel section member 97 extending longitudinally for the length of conveyor means 18 and secured as by welding to the side wall of the conveyor.

Extending alongside and spaced vertically above the top lay 96 of the bulk feed belt 86 is the top belt lay 98 of the dribble feed belt 87, the top lay 98 being supported by an inverted channel section member 100 secured as by welding to the opposite side wall of the conveyor 18.

In FIGS. 1, 6 and 7 it will be noted that the lower end of the bulk feed belt 86 is supported from a transverse axle 101 which carries a suitable drum 102 about which the belt 86 passes. Similarly the lower end of the dribble feed belt 87 is supported by an axle 103 having a drum 104 thereon to support the belt 87 as it turns about axle 103, axle 103 being spaced forwardly of axle 101. Both drums 102 and 104 may be idle drums.

The top lay 98 rises above the level of top lay 96 by spacing channel member 100 above channel 97 for a major portion of the length of belt means 86, 87. Such vertical spacing is at least greater than the height of an article on belt means 86 so that excess articles on lay 98 may fall to lay 96 as the articles are advanced towards the discharge zone.

At the top end of conveyor means 18, it will also be noted that the top lays 96, 98 come together and merge into the same discharge zone (FIG. 7). The top ends of belts 86, 87 are supported by drive drums 104 and 105 respectively of the same diameter and supported about a single common axial fixed shaft 106 secured against rotation as by welding to a longitudinal partition wall 107 provided at the discharge zone of conveyor means 18. In this example, drive drum 104 includes a lateral hub 108 which extends outboardly from wall 82 and is supported in a suitable bearing means 109 secured to wall 82. At the outer end of hub means 108 is carried a sprocket 110 engaged by a drive roller chain means 111 connected to drive motor means 112 which has a motor shaft and sprocket engaging the lower end of drive chain means 11 and which is supported by base frame 25 at the conveyor means 18.

Similarly, the dribble feed belt 98 has its drive drum 105 provided with an outboardly extending hub 114 supported by a bearing means 115 carried by the opposite side wall of the conveyor. At its outer end, hub 114 supports a sprocket 116 which is engaged by a drive roller chain means 117 which is connected in similar manner to a drive motor means 118 on base frame 25 through a motor shaft and sprocket which engages the lower end of chain means 117.

Articles to be bagged such as potatoes or other produce are supplied to the lower end of conveyor means 18 from a suitable source in a suitable manner. The articles are distributed over the lower ends of the two feed belts 86 and 87. Upon actuation of the belts 86 and 87 which are driven simultaneously at the same rate of speed, articles are advanced upwardly until they are discharged over the common top end of belt means 86 and 87 onto discharge apron 91 for feeding through the bag holding means into the bag 12. Since the dribble belt means has a higher elevation for a major portion of its length, articles conveyed thereby will either fall onto the bulk feed belt means or will fall rearwardly so that when a pocket defined by spaced transverse cleats on the top lay of the dribble feed conveyor reach the top a discrete preselected article or plurality of articles is available for feeding into bag 12. Since both conveyor means transport articles at the same rate of speed it will be readily apparent that maximum capacity of the conveyor means 18 is used to rapidly fill bag 12 while at the same time this dribble belt means 87 is conditioned to feed articles in preselected discrete amounts to a precise bag weight.

At bag filling and weighing station 16 it is desired that a preselected weight be carried by each bag 12. In this example weighing means 17 includes a well-known beam scale and is located at station 16 with a weighing platform 120 located beneath the discharge zone and bag 12. At opposite sides of platform 120 and fixed thereto are spaced upstanding weight transmitting posts 121 having inwardly extending transverse top plates 122 of a width approximately that of bag holding means 14 or slightly greater and including inclined approach ramps 123 and departure ramps 124. Each bag holding means 14 carries diametrically outwardly directed arms 126 carrying ball roller means 127 for rolling engagement with the inturned plates 122. Thus, when a bag holding means and bag is moved into the filling and weighing station 16 the ball roller means 127 engages the inclined ramps 123 to lift the bag holding means and bag off its hanging support at nuts 49 so that the scale means will be responsive to the weight of the articles fed to the bag 12 and to the tare weight of the bag holding means 14 and associated equipment carried by the bag holding means.

Figure 8:
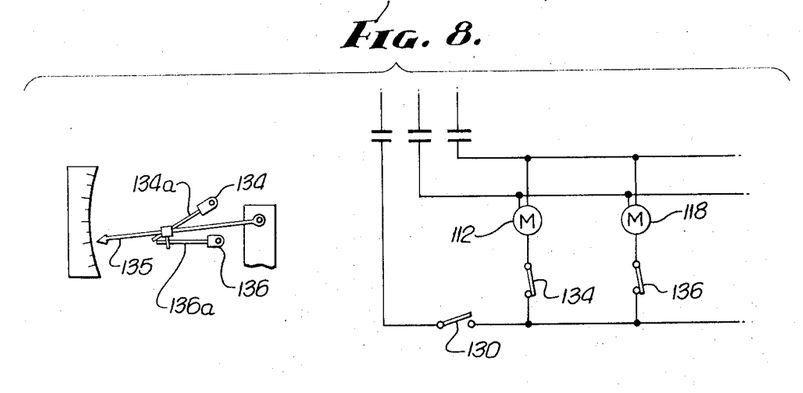
FIG. 8 is a schematic view of a circuit arrangement utilized in the apparatus shown in FIG. 1 and showing a portion of the weighing scale.

Means for actuating conveyor means 18 for a filling and weighing operation includes a limit switch means 130 (FIGS. 4 and 8) having a contact member 131 adapted to be engaged by an upstanding pin 132 provided on the arm means 34. Upon closing of the normally open limit switch 130, motor means 112 and 118 of the conveyor means 18 are energized and both dribble feed belts 87 and main feed belt 86 are simultaneously actuated and driven at the same rate to move articles to the discharge zone and into the bag 12. As the bag is filled the scale platform 120 is depressed and limit switch means 134 carried by the scale and having a contact arm 134a to be engaged by indicator 135 is actuated into open position to top the drive motor means 112 and to stop the main feed belt 86. Such independent operation of the main feed belt does not effect the continuing operation of the dribble feed belt 87 which adds articles to the bag until the final weight is reached at which time limit switch 136 having contact arm 136a engageable by a switch element carried by the indicator is actuated to open position to stop the dribble feed conveyor. Upon stopping of both feed belts the operator manually turns the arm means 34 to position an empty bag 12 at the filling and weighing station 16 and to move the filled bag through the bag release station 18 where the bag is deposited upon a receiving end 140 of transport conveyor 21.

Transport conveyor 21 may be suitably mounted upon the base frame 26 and carries a filled bag 12 to sewing station 22. At sewing station 22 a pair of upstanding lateral supporting belt means 142 may be provided together with means for grasping and carrying the top portions of the filled bag in closed relation to sewing head means 144 at which position a sewing needle secures the top of the bag in closed relation with a selected form of stitching well known in the art. The sewing station may include a bag sewing and closure means such as described in my U.S. Pat. No. 3,554,146. After the bag has been closed it may be removed from the conveyor 21 and transported by suitable means to a shipping or storage location.

It is important to note that apparatus 10 provides a bag filling and weighing apparatus which fills a need for efficient rapid filling of bags with articles by partly manually and partly power driven machine. Filling and weighing machines of two filling and weighing station type shown in my U.S. Pat. Nos. 3,416,617 and 3,416,620 are designed for greater capacity and volume with less manual operation.

In apparatus 10, arm means 34 is essentially positioned at only two stations, one a bag attaching station and the other the bag filling and weighing station. The bag release station is passed through during the transition of an end of arm means 34 from one of the first mentioned stations to the other. Both bag filling and weighing is accomplished at one station with precise weight being achieved by the novel construction and operation of the conveyor means 18. Thus, while articles are fed at random and indiscriminately to the feed end of conveyor means 18 both dribble and bulk feed belts are fully used simultaneously to feed articles into the bag for the initial below final weight bag filling condition. When the below weight condition is reached, the main feed belt 86 is stopped and the dribble feed belt continues adding articles to the bag at station 16 in discrete selected amounts so that overfilling beyond a preselected tolerance will not occur. Thus, apparatus 10 serves to effectively and efficiently precisely fill bags or receptacles presented to the bag filling and weighing station 16 without movement of the bag from the one filling and weighing station.

Figure 9:
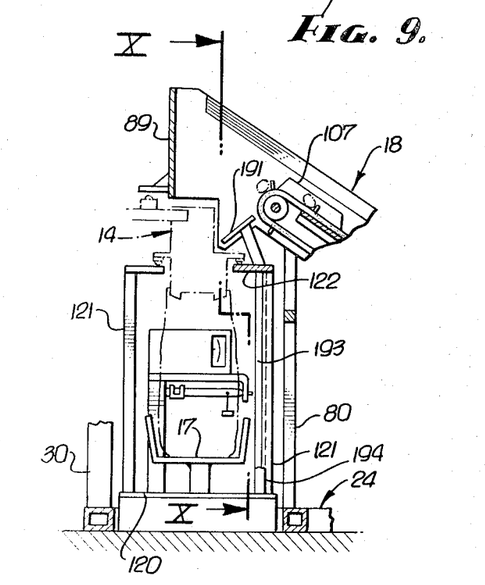
FIG. 9 is a fragmentary elevational view, partly in section, of a modification of the discharge end of the conveyor means and weighing of articles discharged by the dribble feed belt.
Figure 10:
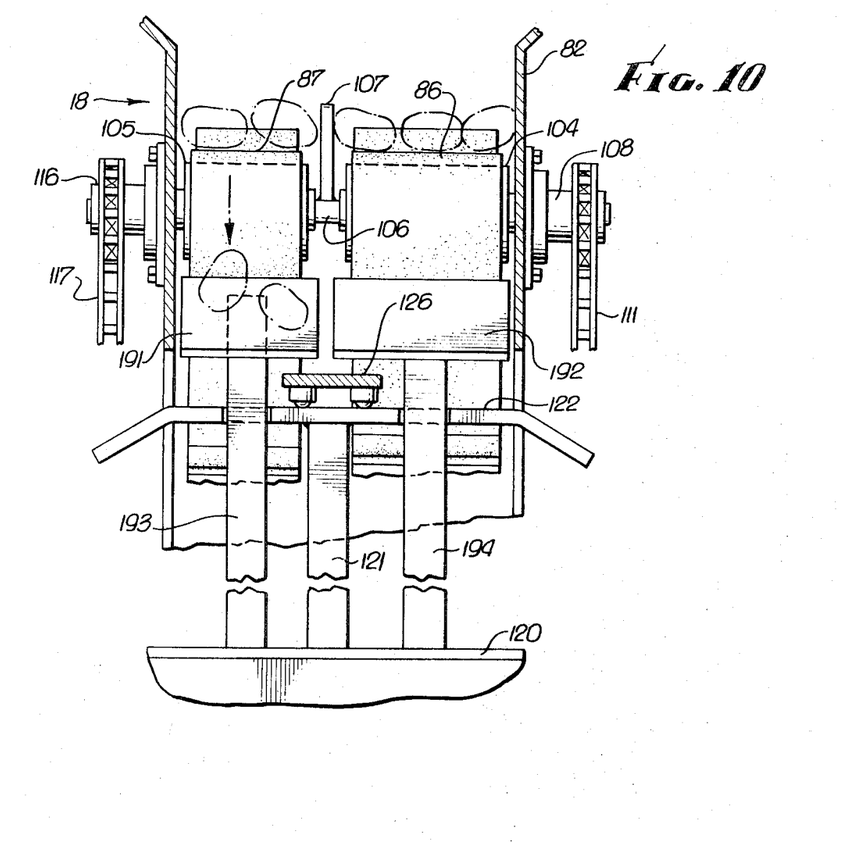
FIG. 10 is a vertical sectional view taken in the plane indicated by line X—X of FIG. 9.
Figure 11:
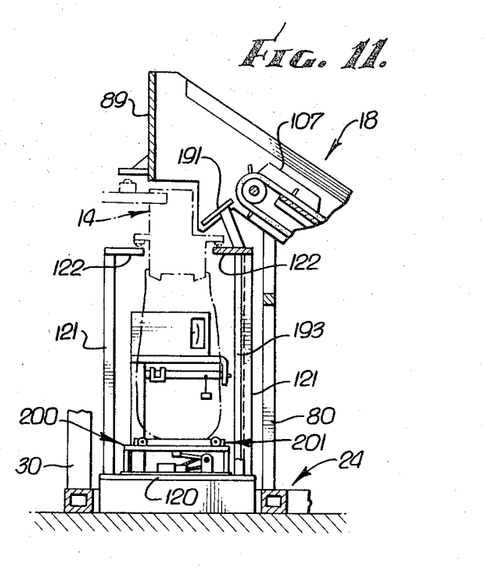
FIG. 11 is a fragmentary elevational view, partly in section and similar to FIG. 9, of a modification of the invention and showing means to impart vibrations to a receptacle.

In the modification shown in FIGS. 9 and 10, means to increase the rate of filling and weighing of a bag is illustrated. In this embodiment, means including a discharge apron 191 for the dribble feed means is separated and slightly spaced from the discharge apron 192 which guides articles in bulk feeding into a receptacle. In this example, discharge aprons 191, 192 are supported independently and are carried on respective upstanding columns 193, 194, which have their bottom ends fixed to scale platform 120. Columns 193, 194 extend past or through openings in plate 122. It will be noted from the above description that bag holding means 14 in weighing position is supported from plate 122 which is carried by upstanding columns 121 fixed to scale platform 120.

As articles are fed from both dribble and bulk feed conveyor belts 87 and 86 and articles strike discharge aprons 191, 192, weights of the articles are immediately transmitted to scale platform 120 through columns 193, 194 before the article is received and deposited in the bag and before weight of the article is sensed through bag holding means 14 and its temporary support on the scale platform 120. Bulk feeding continues until a preselected underweight condition is reached, the bulk feed conveyor 86 is stopped, and the dribble feed continues until the final precise weight is reached. The last article fed to the receptacle is sensed by discharge apron 191 which causes an immediate response in the weighing system before the article comes to rest in the bag. Dribble feed conveyor belt 87 immediately stops and the bag holding means and arm can be swung to and through bag release position without any delay caused by waiting for the last article to reach its position in the bag. Thus rapid sensing of the weight of the last article is accomplished by means of circuitry described in the prior example. Moreover, the chance of an extra article being fed to the bag is minimized because the dribble feed conveyor belt 87 will have stopped upon the immediate sensing of the final weight article as it strikes the discharge apron 191, and the next article would not have reached the discharge zone.

It will be understood that the relative speeds of the bulk and dribble feed conveyor may be varied to facilitate precise control of the material being fed to the receptacle. Where material being packaged is of sized discrete articles, such as potatoes, the feed conveyors may be operated at about the same speed, the dribble feed usually being slightly slower than the bulk feed. In those instances where the material is relatively free flowing, although composed of chunky, discrete pieces such as hay pellets or pieces of tree bark, the number of discrete pieces of material on the dribble feed conveyor will usually exceed one piece. Dribble feed conveyor speed relative to bulk feed speed is preferably reduced and under some conditions may be only one-half that of the bulk feed speed.

In some installations, it may be desirable to support the dribble discharge apron 191 directly from plate 122 instead of extending the support column to the scale platform 120. It will be further understood that such an immediately responsive weighing device will be useful in not only a filling and weighing means embodying the present invention, but will also be useful in filling and weighing machines described in my U.S. Pat. Nos. 3,416,619 and 3,416,620 as the result of determining and responding to the weight of an article immediately upon discharge from the article feed conveyor.

In the embodiment of the invention shown in FIGS. 11-14, vibratory means generally indicated at 200 may include vibratory means 201 to impart vibrations with horizontal vibratory components only to receptacle or bag 12, such vibratory means 201 being interposed between the scale platform 120 and the bottom of bag 12. A moveable member or shaking platform 202 is positioned at a selected height beneath bag 12 so that the bottom of the bag may contact as at 203 the top surface of platform 202.

Means for supporting said moveable member 202 or platform for horizontal movement in a horizontal plane only and in this example along the longitudinal axis of the apparatus 10 may comprise a pair of wheels 204 antifrictionally mounted at opposite ends of platform 202 and rollably guided in parallel upwardly facing channel members 205. Channel members 205 may be supported by suitable framework as upstanding columns 206 fixed at their lower ends to a plate member 207. Plate member 207 may be made of steel of selected thickness and may overlie and rest upon the top surface of scale platform 120 as at 208.

Figure 12:
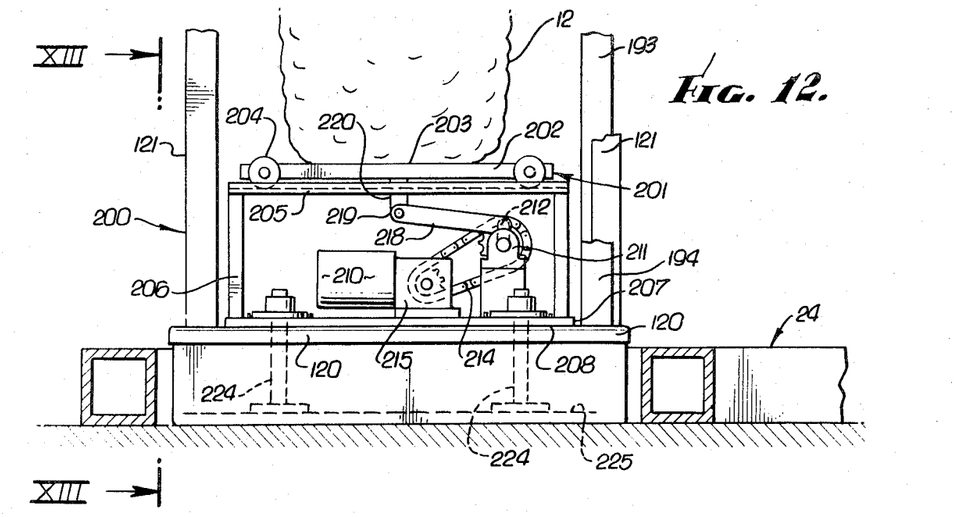
FIG. 12 is an enlarged fragmentary elevational view of the vibratory means shown in FIG. 11.
Figure 13:
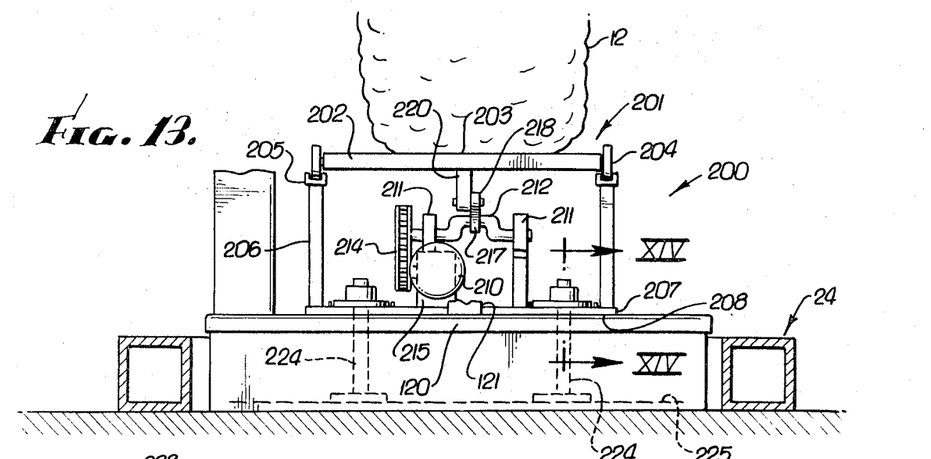
FIG. 13 is a view taken from the plane indicated by line XIII—XIII of FIG. 12.

Generally centrally of plate 207, a relatively small motor means 210 may be carried by plate 207. Spaced from motor means 210 may be a pair of upstanding shaft supports 211 on which may be antifrictionally mounted an offset shaft 212 which may be driven at one end thereof by chain and sprocket means 214 driven by motor means 210 through a suitable gear means 215. Offset shaft 212 may be pivotally connected to one end 217 of a link 218 pivotally connected at its other end 219 to a depending bracket 220 secured to the central under surface portion of shaker platform 202.

It will thus be apparent that upon energization of motor means 210, chain and sprocket means 214 will rotate offset shaft 212 which will reciprocate link 218 longitudinally to impart through bracket 220 reciprocal movement to platform 202. Such rapid reciprocal movement imparted to shaking platform 202 will impart through contact at 203 with receptacle 12 such horizontal vibrations and shaking movement to bag 12 and the contents thereof.

Figure 14:
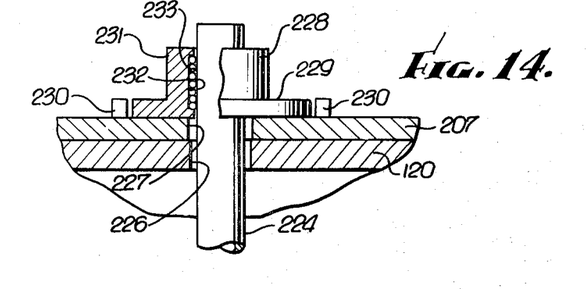
FIG. 14 is a fragmentary sectional view taken in the plane indicated by line XIV—XIV of FIG. 13.

Means for isolating such vibration from the scale platform and to permit the scale platform to respond to articles fed to bag 12 and to the discharge aprons 191 and 192 includes pairs of upstanding posts 224 arranged at opposite ends of the steel plate 207 and seated upon base member 225 of the scale means. Posts 224 may extend upwardly through enlarged aligned openings 226 and 227 respectively in scale platform 120 and plate 207. On the top of plate 207 at each post 224, a flanged collar means 228 may be ensleeved over the upper end of post 224, said collar means 228 including a generally rectangular flange portion 229 which is loosely located between stop members 230 disposed on each side of the rectangular flange portion 229. The collar portion 231 of collar means 228 includes an inner chamber 232 in which a plurality of ball-type bearings 233 may be retained to permit virtually free unrestrained vertical movement of scale platform 120 and plate 207 relative to the upstanding posts 224. Other types of antifriction means which permit movement axially of post 224 may be utilized.

It will thus be apparent that the vibratory means 201 must be considered in the amount of tare weight when presetting the scale means to the selected underweight condition and final precise weight condition.

In operation of apparatus 10 including the vibratory means 201, articles fed from the bulk end dribble feed conveyor means will be discharged onto discharge aprons 191 and 192 and the weight of such articles transmitted by columns 193 and 194 to scale platform 120. As articles travel off discharge aprons 191 and 192, they fall into bag 12 and at the bottom of bag 12, are located in partial weight relation to the surface of shaker platform 202 which transmits the article weight through wheels 204 to end columns 206 to plate 207 and scale platform 120. Scale platform 120 and plate 207 are readily depressed by reason of the axially disposed bearing means 233 in response to article weight received through plates 122 and columns 121 and platform 202. Since the flanged column means 288 has very loose tolerance with its stops 230 and the aligned openings 226 and 227 are enlarged as compared to the diameter of posts 224, it will be apparent that vertical movement of the scale platform and plate 207 relative to posts 224 is virtually unrestrained. Vibratory means 202 because of its eccentric and linkage arrangement together with the wheel mounting of shaker platform 202 will impart only reciprocal movement in the horizontal plane of the channel members 205. Since the vibratory impulses are limited to a horizontal plane only, vertical components of such vibratory action are reduced to a minimum and are insignificant when translated to the vertical response of the scale platform to the weight of articles fed to the scale means and into the bag 12. Thus the function of weighing articles being fed is effectively isolated from the function of imparting a shaking motion to bag 12 and its contents. It is understood that with some articles, shaking of bag 12 is highly desirable in order to provide a firm pack and bags or receptacles which may be easily and readily handled in shipment and storage.

In a preferable mode of operation, the vibratory means 201 may be actuated during bulk filling and until the preselected underweight condition is reached. At the moment the bulk feed is topped, the vibratory means 201 may be also stopped so that the few articles to be fed to the bag by the dribble feed to bring the bag to precise final weight may be added to the bag without vibration thereof. It will be understood that the bag will be substantially filled at the preselected underweight condition and that vibration during the major period of filling will settle the articles in the receptacle so that the remaining dribble feed articles can be readily accommodated in the receptacle or bag.

Various modifications and changes may be made in the examples of the invention described above and all such changes which come within the spirit of the invention and within the scope of the appended claims or embraced thereby.

I claim:

1. In combination with a conveyor means for articles and a weighing means adjacent the discharge end of said conveyor means responsive to weight of articles collected in a receptacle supported from said weighing means:
   means between said conveyor means and said receptacle for guiding articles along a path into said receptacle;
   said guiding means being cooperably connected with said weighing means whereby said weighing means is responsive to the weight of an article before said article is in a receptacle;
   and means between said weighing means and said receptacle for imparting vibrations in one plane to said receptacle and material therein and in isolated relation to said weighing means.

2. In the combination as stated in claim 1 wherein said vibration means imparts horizontal vibrations to said receptacle while said weighing means is responsive to articles fed to said receptacle.

3. In the combination as stated in claim 1 wherein said means between said weighing means and said receptacle comprises:
   a moveable member adapted to contact said receptacle;
   means supporting said moveable member for horizontal movement thereof;
   and eccentric means carried by said supporting means and connected to said moveable member for imparting horizontal vibrations thereto.

4. In combination with a weighing and filling apparatus for rapidly filling a receptacle to a precise predetermined weight;
   a vibratory means comprising:
   a platform means beneath a receptacle and adapted to contact said receptacle during filling thereof;
   means supporting said platform means for movement in a horizontal plane and adapted to be seated upon a scale platform;
   and eccentric means carried by said support means and connected to said platform means for imparting vibratory movement thereto in a horizontal plane.

5. In the combination as stated in claim 4 including:

means for providing relative vertical movement of said scale platform and said supporting means during weighing and isolating such relative vertical movement from said horizontal vibrations.

6. In combination with a scale means and a receptacle filling means which is adapted to fill at a weighing and filling station a receptacle in weighing relation to said scale means:
   means for contacting said receptacle at said station;

vibratory means for imparting vibrations to said contact means and thereby to said receptacle;
   and means for supporting said vibratory means and said contacting means independently of vertical movement of said scale means.

7. In a combination as stated in claim 1 wherein said supporting means includes upstanding posts loosely and antifrictionally related to said scale means.

8. In the combination as stated in claim 1 wherein said contacting means includes a frame structure for supporting said vibratory means;
   and wherein said frame structure includes antifriction means for said support means.

* * * * *